Figure 1:
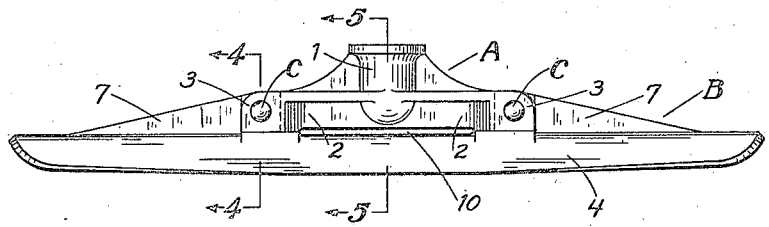

Sept. 25, 1923.

S. S. MATTHES

CONDUCTOR SUPPORT

Filed May 28, 1923

1,469,098

Inventor
SAMUEL S. MATTHES.

G. G. Allenbaugh    By    [signature]
                          Attorney

Patented Sept. 25, 1923.

1,469,098

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed May 28, 1923. Serial No. 641,915.

*To all whom it may concern:*

Be it known that I, SAMUEL S. MATTHES, a citizen of the United States of America, residing at Mansfield, in the county of Richland and State of Ohio, have invented certain new and useful Improvements in Conductor Supports, of which the following is a specification.

My invention relates to a supporting device for trolley conductors and has particular reference to that type of support known as a trolley ear in which a groove is formed to receive a trolley wire and provided with lips forming the groove which are bent around the wire to secure the two together.

The object of my invention is to produce a device which is simple and cheap and in which the part is subject to wear can be replaced at a nominal expense in the way of material and labor.

Figure 2:
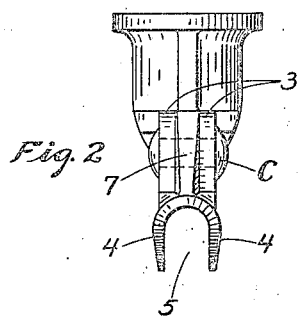
Figure 6:
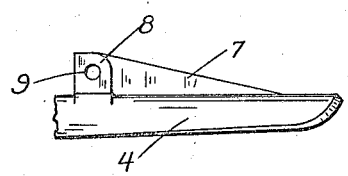
Figure 3:
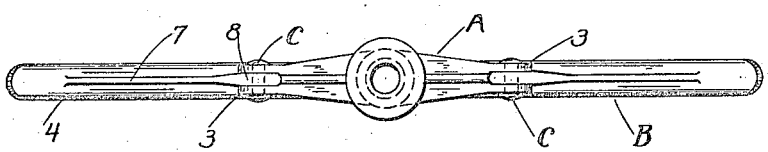
Figure 5:
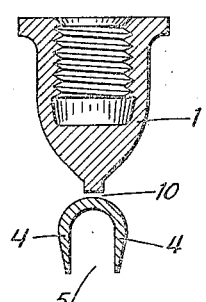
Figure 4:
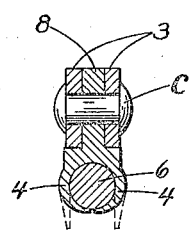

In the drawing accompanying this specification:

Fig. 1 is a side view of my invention.
Fig. 2 is an end view of my invention.
Fig. 3 is a top view of my invention.
Fig. 4 is a sectional view on the line 4—4 of Fig. 1.
Fig. 5 is a sectional view on the line 5—5 of Fig. 1.
Fig. 6 is a view of one end only of the member B, the other end being a duplicate of that shown in this figure.

In the preferred form of my invention I employ three main parts; namely, a suspension clevis A, a suspension yoke B and the rivets, or other means, C for securing the parts A and B together.

The suspension clevis A comprises a boss member 1 internally threaded as shown in Fig. 5 to receive a supporting stud. Secured to the boss member and projecting laterally therefrom are arms 2 and each arm terminates in a clevis 3. I prefer to make the suspension clevis A of malleable iron as this is strong, durable and economical, although the member A may be made of any other suitable material desired. Each clevis 3 is provided with a passage therethrough to receive the rivets or other securing member C.

The supporting yoke B comprises the lips 4 which form a U shaped groove 5 in which is positioned the trolley wire 6. The lips 4 are bent or peened around the trolley wire to secure the two together as shown in Fig. 4. Projecting upwardly from the union of the lips 4 at each end and extending well toward the center of the supporting yoke are flanges 7 which are thickened at their inner end as indicated by the numeral 8. The thickened portion 8 of the flange 7 is of such size and so positioned as to fit in the opening of the clevis 3 and is provided with a passage 9 which coincides with the passage in the clevis member to receive the rivets C. The member B is preferably made of copper or a copper base bronze which is standard practice in the construction of a device of this character.

The parts A and B having been assembled in proper relation to each other, the rivets C are inserted and headed up thereby uniting the parts securely together. The construction of the members A and B are such that when the device has been assembled there is an open space 10 between these parts and no metal whatsoever integrally connecting the members 8—8 other than that forming the lips 4. As the copper base metal is rather expensive I find with the construction herein disclosed that it is unnecessary to connect the members 8—8 integrally with each other otherwise than through the metal forming the lips, thereby reducing the cost of the device materially. I also find that the slot 10 has a tendency to offer a little resiliency in the device. It will be quite apparent that as the lips 4 of the member B are subjected to the action of the trolley wheel that this part in time will wear down and require renewal and, therefore, with my construction it is only necessary to remove the part B from the part A by clipping the heads of the rivets C and substituting a new part B and securing it in place as described.

It will be apparent to those skilled in the art that I have herein disclosed a new and novel arrangement of the parts A and B, thereby producing a new and novel trolley wire support as a whole, and that the same is open to modification.

I claim:—

1. A conductor support comprising a yoke member and a clevis member secured together, the yoke member provided with spaced members to be secured to the clevis member and the clevis member positioned between the spaced members, means on the clevis member to secure the support to a hanger, and means on the yoke member to receive and engage a conductor.

2. A conductor support comprising a yoke member and a clevis member secured together, the clevis member provided with oppositely projecting arms having a clevis at the extreme end of each arm and means to secure the clevis to a hanger, the yoke member provided with spaced members to be positioned one in each clevis, and having means to receive and grip a conductor, and means securing the yoke and clevis members together.

3. A conductor support comprising a yoke member and a clevis member secured together, the clevis member provided with oppositely projecting arms having a clevis at the extreme end of each arm and means to secure the clevis to a hanger, the yoke member provided with members to be positioned one in each clevis, and having means to receive and grip a conductor and means securing the yoke and clevis members together.

4. A conductor support comprising a yoke member and a supporting member secured together, the supporting member provided with oppositely projecting arms and means to secure the device to a hanger, the yoke member provided with attaching means, a space formed in said attaching means and the supporting member positioned within said space, means securing the yoke and supporting members together and means on the yoke to engage and grip a conductor.

5. A conductor support comprising a yoke member and a clevis member secured together, the clevis member provided with oppositely projecting arms having a clevis at the extreme end of each arm and means to secure the clevis to a hanger, the yoke member provided with members to be positioned, one in each clevis, a longitudinal slot between the yoke member and the clevis member, means on the yoke member to receive and grip a conductor and means to secure the yoke and clevis members together.

6. A conductor support comprising a support member for attachment to a hanger, projecting means secured to the support, means to engage and grip a conductor, spaced means projecting from the last said means, the projecting means positioned in the space formed by the spaced means and secured to the said spaced means.

7. A conductor support comprising a yoke member provided with a space formed by spaced projecting means thereon, a clevis member positioned in the space and provided with means to secure the support to a hanger, attaching means on the yoke member, attaching means on the clevis member and means to secure the attaching means on the two members together to unite the members.

8. A conductor support comprising a yoke member consisting of a pair of lips forming a groove to receive a conductor, a pair of spaced upstanding members forming a yoke, a support member interposed between the upstanding members and secured thereto and means to secure the support member to a hanger.

In testimony whereof I affix my signature.

SAMUEL S. MATTHES.